May 10, 1966 P. B. O'REILLY ETAL 3,250,926
VENTILATED MOTOR
Filed April 11, 1963 2 Sheets-Sheet 1

PAUL B. O'REILLY
DONALD H. ROBERTS
INVENTORS.

BY Flam and Flam
ATTORNEYS.

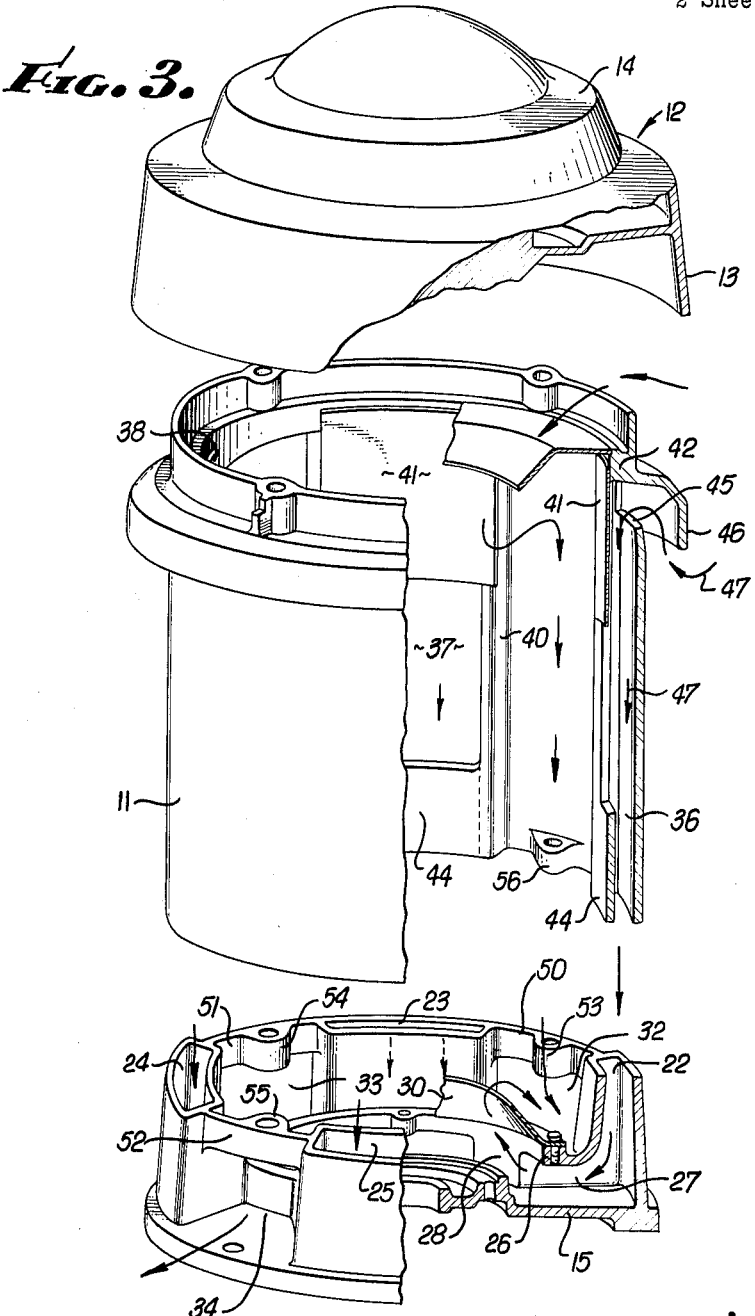

United States Patent Office 3,250,926
Patented May 10, 1966

3,250,926
VENTILATED MOTOR
Paul B. O'Reilly, Pico-Rivera, and Donald H. Roberts, Los Angeles, Calif., assignors to Emerson Electric Co., a corporation of Missouri
Filed Apr. 11, 1963, Ser. No. 272,353
12 Claims. (Cl. 310—60)

This invention relates to a vertical motor, such as for above ground use in driving the vertical shaft of a pump. Particularly this invention relates to a ventilation system for cooling.

In small motors, rated, for example, under 10 H.P., adequate cooling may be provided by passing a single stream of air vertically through the motor. For example, cold air may enter the housing from above the rotor, and be urged about the thrust bearing, windings, then downwardly about the stator, and perhaps through the rotor, then about the windings to outlet openings at the bottom of the housing. Fan blades cast integrally with the rotor may be used to create this air stream.

In larger motors, rated, say, 10 H.P. and up, the foregoing method of circulating air is not entirely effective. Thus the air may be unduly heated before its reaches the parts located at the lower end of the rotor. Of course, the physical size of the housing could be increased, but this is not desirable. One solution has been to provide two different air streams, one for the upper end of the motor and one for the lower end. The difficulty with this arrangement has been that the intake for the lower air stream is too close to the exhaust, and the inlet air is preheated, reducing efficiency.

An object of this invention is to provide an improved ventilation system, especially adapted for use with motors of high power rating, and in which both ends of the motor are effectively cooled.

Another object of this invention is to provide a motor ventilation system of this character in which two parallel paths are provided for cooling the upper and lower ends of the motor respectively, but in which the inlets for both paths are located at the upper end of the motor while the outlets are located at the lower end, ensuring maximum efficiency. In order to accomplish the foregoing function, the motor housing is uniquely constructed to provide appropriate air ventilation paths.

Another object of this invention is to provide a motor ventilation system which by virtue of a unique arrangement ensures that the volume of air circulated is substantial.

Still another object of this invention is to provide a motor ventilation system in which the temperature of the frame is quite low.

This invention possesses many other advantages, and has other objects which may be made more clearly apparent from a consideration of one embodiment of the invention. For this purpose, there is shown a form in the drawings accompanying and forming a part of the present specification, and which drawings, unless as otherwise indicated, are true scale. This form will now be described in detail, illustrating the general principles of the invention; but it is to be understood that this detailed description is not to be taken in a limiting sense, since the scope of this invention is best defined by the appended claims.

Referring to the drawings:

FIG. 3 is an exploded fragmentary sectional view illustrating the construction of the cover, housing and mounting base.

Figure 1:
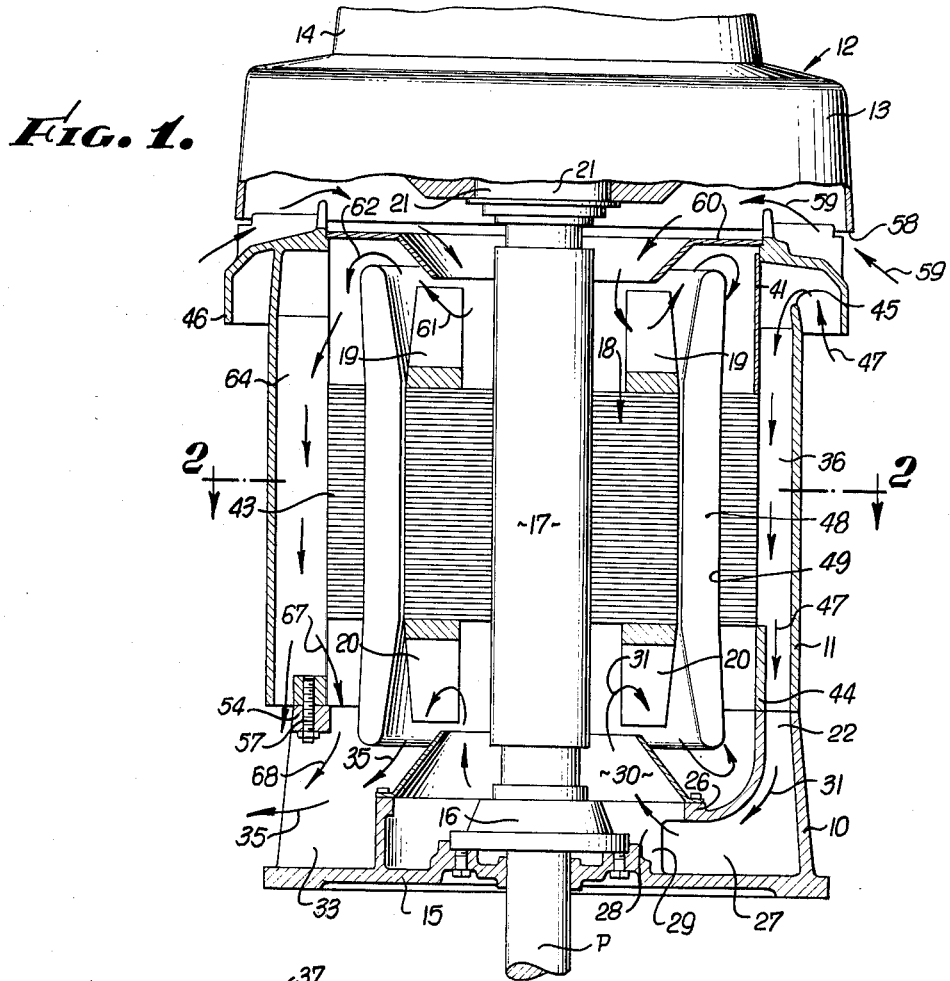
FIGURE 1 is a fragmentary revolved axial sectional view of a motor incorporating the present invention.
Figure 2:
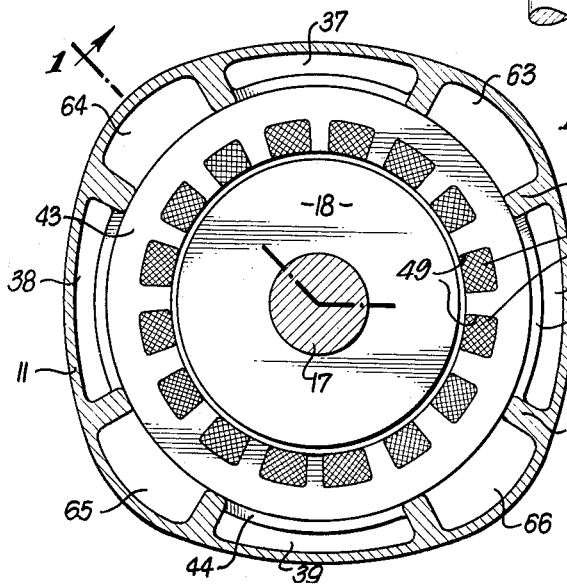
FIG. 2 is a transverse sectional view taken along the plane corresponding to line 2—2 of FIG. 1, FIG. 2 illustrating by line 1—1 the axial sectional planes of FIG. 1.

The motor structure shown in the drawings includes a mounting base 10, a central housing section 11 and a cover 12 that may be made as precision castings.

The cover 12 may include two parts, a lower cowl part 13 and a cap part 14 which is readily detachable from the cowl part 13.

The mounting base 10 has a circular plate 15 adapted to be secured to the upper surface of the pump head. A lower bearing structure 16 is supported at the center of the wall 15.

A hollow shaft 17 of the motor structure projects vertically upwardly from the bearing 16. The motor shaft 17 carries a rotor structure 18. The rotor structure 18 in this instance includes integrally cast aluminum parts providing fan structures 19 and 20 at opposite ends. The rotor and fan may be made in other manners. These fan structures not only induce currents of air, but also serve to conduct heat from the rotor to the air current so created.

The upper end of the hollow shaft 17 is supported by a thrust bearing structure 21. The thrust bearing structure 21 is supported by radial ribs or webs formed in the cover 12.

The pump shaft P extends upwardly through the bearing 16, the hollow shaft 17 and the upper bearing 21 for connection to the upper end of the hollow shaft 17.

The mounting base 10 provides a number (in this instance four) of equiangularly located air ducts 22–25 for cooling the lower bearing 16 as well as the lower end of the motor structure. The ducts 22–25 have narrow generally arcuate upper inlet openings located at the periphery of the upper edge of the base 10.

The outer walls of the ducts 22–25 extend generally vertically from the periphery of the base plate 15. The inner walls of the ducts 22–25 curve inwardly and terminate at a common circular ring 26. The ring 26 is located above the base plate 15 and in spaced encompassing relationship to the lower bearing 16. The side walls 27 of the ducts 22–25 are generally L-shaped, and also terminate inwardly at the position of the circular ring 26. Arcuate walls 28 join the inner ends of the side walls of adjacent ducts. A circular channel 29 (FIG. 1) is thus formed about the lower bearing that communicates with the ducts 22–25.

A frusto-conical deflector plate 30 has a base flange mounted upon the circular ring 26. The upper open end of the deflector plate 30 terminates just short of the fan structure 20 and registers with the space on the inner side of the fan structure 20. The fan structure 20 operates to induce downward and inward flow of air in the ducts as indicated by the arrows 31. This air is caused to sweep past the lower bearing structure 16 and upwardly through the deflector plate 30. The air can then pass along the top of the plate 30 to spaces between the ducts 22–25 which provide exhaust openings 32, 33, 34, etc. (FIG. 3) and as indicated by the arrows 35 in FIGS. 1 and 3.

Ducts 36, 37, 38 and 39 formed in the housing section 11 respectively extend the inlets of the ducts 22–25 of the mounting base 10 upwardly and away from the exhaust openings 32, 33, 34, etc. The outer walls of the ducts 36–39 are formed by the common peripheral wall of the housing section 11. The side walls of the ducts 36–39 are formed by vertical ribs 40 on the inside of the housing section.

The inner walls of the ducts 36–39 are formed in three parts. The first or upper part of each duct is provided by an individual arcuate plate 41 having sides overlying the inner edges of the ribs 40. The upper part of the plate 41 is attached by suitable means to the inner surface of a circular top ring 42 cast integrally with the housing 11.

The second or intermediate parts of the inner walls of the ducts 36–39 are formed by the peripheral surface of the stack of stator laminations 43 which fit against the ribs 40. The top lamination of the stack 43 abuts or closely approaches the lower end edges of the plates 41.

The third or lower section of the inner wall of each of the ducts is formed by an arcuate wall 44, cast integrally with the housing section 11. The sides of the walls 44 merge with the lower ends of the ribs 40, and the upper edges of the walls 44 are located at the level of the bottom lamination of the stack 43.

The outer wall of the housing section 11 has openings 45 located just beneath the top ring 42 to form intakes to the ducts 36–39. A cowl 46 projects outwardly from the ring 42 and over the openings 45 suitable to shield them.

The lower ends of the ducts 36–39 register with the upper ends of the ducts 22–25, there being companion mutually engaging surfaces of the mounting base 10 and housing section 11. The ducts 36–39 thus form upward extensions of the ducts 22–25 and serve to supply cool air from the region spaced substantially from the exhaust openings 32, 33 and 34. The air passing through the ducts 36–39, as indicated by the arrows 47, produces a cooling effect on the stator lamination stack 43.

This air, as indicated at the arrows 35, also passes along the lower ends of windings 48 accommodated in the slots 49 of the stator lamination stack 43.

In order to secure the housing section 11 to the mounting base 10, webs 50, 51, 52, etc. are provided that extend between the walls forming the ducts 22–25. These webs extend across the top of the openings 32, 33, 34, etc. and have inwardly extending bosses 53, 54, 55, etc. that register with companion bosses 56, etc. formed on the housing section 11. The top edges of the webs 50, 51 and 52 engage the lower edges of the housing section 11 at the areas between the ducts 36–39. Suitable fasteners 57 extending upwardly through the bosses secure the parts together.

A second current of air is provided for cooling the bearing structure 21, the upper end of the rotor, the windings at the upper end of the stator stack 43 and also the stator laminations. This current of air enters the cowl part 13 of the cover 12 above the cowl 46 formed on the housing section 11. Thus, the circular edge 58 of the cowl part 13 is spaced vertically above the cowl 46 and defines an annular intake, as indicated by the arrows 59. The air so entering passes above the circular wall 42 of the housing section 11 and thence downwardly between the thrust bearing 21 and the top surface of a conical plate 60. The plate 60 is attached at its periphery to a shoulder formed in the circular ring 42. The air then passes to the space within the blades 19, past the upper ends of the windings 48 and along the under surface of the deflector plate 60, as indicated by the arrows 61 and 62. The air then passes to channels 63, 64, 65 and 66 located between the ducts 36–39.

The upper ends of the channels 63–66 communicate with the space beneath the baffle plate 60. The stack of stator laminations 43 cover the intermediate portions of the channels 63–66, but the lower ends of the channels are open and communicate with a circular space beneath the stack of laminations 43 and the lower ends of the windings 48. The air can then pass outwardly through the openings 32, 33, 34 and 35, as indicated by the arrows 67 and 68.

The inventors claim:

1. In a dynamoelectric machine: a housing; a stator mounted by the housing; windings carried by the stator and having opposite ends projecting beyond the stator; a rotor structure in the stator, said rotor structure including a shaft, said rotor structure having fan elements at opposite ends; means forming a first air passage in the housing having an intake opening adjacent one end thereof and communicating with the fan element and winding ends at the other end of the housing, said first air passage having an exhaust adjacent said other end of the housing; and means forming a second air passage in the housing having an intake opening adjacent said one end and communicating with the fan element and winding ends at said one end of the housing, said second air passage having an exhaust adjacent the said other end of the housing; said fan elements being arranged respectively to induce flow of air into said intake openings and out of said exhausts whereby both intake openings are located remote from both exhausts thus to minimize recirculation of exhausted air.

2. The combination as set forth in claim 1 wherein said dynamoelectric machine is provided with bearing structures for opposite ends of said shaft, said bearing structures being respectively located adjacent said fan elements and exposed respectively in the said air passages respectively.

3. In a dynamoelectric machine: a housing; said housing having a number of angularly spaced ducts extending longitudinally along the periphery of the housing, there being channels between the ducts opening inwardly of the housing; the ends of said ducts opening at corresponding ends exteriorly at one end of the housing; a stator mounted in the housing and extending across the central portions of said channels; said channels having exhaust openings at the other end of the housing for conducting air outwardly of the housing; windings carried by the stator and having opposite ends projecting beyond the stator; a rotor structure including a shaft, said rotor structure having fan elements at opposite ends and located adjacent said winding ends respectively; means forming an intake opening at said one end of said housing and communicating with the fan element adjacent said one end of said housing for movement of air past the corresponding winding ends and into said channels; and means forming passages from the other corresponding ends of said ducts and communicating with the fan element at the other end of said housing for movement of air past the corresponding winding ends and through the exhaust openings of said channels; said fan elements being arranged respectively to induce flow of air currents in the same direction relative to said exhaust openings of said channels whereby influent air and effluent air are widely separated thus to minimize recirculation.

4. The combination as set forth in claim 3 in which the ducts are substantially arcuate in cross section, peripheral portions of the stator forming parts of the walls of the ducts.

5. The combination as set forth in claim 3 wherein said dynamoelectric machine is provided with bearing structures for opposite ends of said shaft, said bearing structures being respectively located adjacent said fan elements and exposed to the currents of air induced thereby.

6. The combination as set forth in claim 3 in which said winding ends extend in spaced exterior encompassing relationship to the corresponding fan elements; a first conical deflector plate having a rim attached to said housing and having a free inner edge terminating adjacent the winding ends and fan element at said one end of said housing, the outer side of said first deflector plate communicating with said intake opening, and the inner side communicating with said channels, said deflector plate forming a baffle between said channels and said intake opening as well as guiding the current of air along the winding ends; and a second conical deflector plate having a rim attached to said housing and having a free inner edge terminating adjacent the winding ends and fan element at said other end of said housing, the outer side of said first deflector plate communicating with said passages, and the inner side communicating with said exhaust openings.

7. The combination as set forth in claim 6 together with bearing structures for the ends of said shaft, and located in spaced relationship to said deflector plates on the outer sides thereof.

8. In a motor structure: a housing having a mounting base adapted to be secured to a pump head or the like; said mounting base having wall means forming a plurality of angularly spaced ducts extending downwardly along the periphery of the mounting base and thence inwardly toward the center thereof; said mounting base having a ring beneath which the ducts terminate, there being walls between the inner ends of said ducts and beneath the ring to form a circular space; said housing having upward inlet extensions of said ducts; the spaces between the ducts at the region of the mounting base forming exhaust openings from the housing.

9. In a motor structure: a housing having a mounting base adapted to be secured to a pump head or the like; said mounting base having wall means forming a plurality of angularly spaced ducts extending downwardly along the periphery of the mounting base and thence inwardly toward the center thereof; said mounting base having a ring beneath which the ducts terminate, there being walls between the inner ends of said ducts and beneath the ring to form a circular space; said housing having upward inlet extensions of said ducts; the spaces between the ducts at the region of the mounting base forming exhaust openings from the housing there being channels between the inlet extensions of the duct opening within the housing and communicating with said exhaust openings; a stator structure in the housing and extending across the intermediate portions of said channels; and means forming intake openings for the upper ends of said channels.

10. In a motor structure: a housing having a mounting base adapted to be secured to a pump head or the like; said mounting base having wall means forming a plurality of angularly spaced ducts extending downwardly along the periphery of the mounting base and thence inwardly toward the center thereof; said mounting base having a ring beneath which the ducts terminate, there being walls between the inner ends of said ducts and beneath the ring to form a circular space; said housing having upward inlet extensions of said ducts; the spaces between the ducts at the region of the mounting base forming exhaust openings from the housing there being channels between the inlet extensions of the duct opening within the housing and communicating with said exhaust openings; a stator structure in the housing and extending across the intermediate portions of said channels, said structure including windings having ends projecting at opposite ends of the stator structure; means forming intake openings for the upper ends of said channels; a rotor structure in the housing, and having a shaft and fan structures at opposite ends; and a deflector plate mounted on said ring and having an opening located adjacent the fan structure at the lower end of said motor.

11. In a motor structure: a housing having a mounting base adapted to be secured to a pump head or the like; said mounting base having wall means forming a plurality of angularly spaced ducts extending downwardly along the periphery of the mounting base and thence inwardly toward the center thereof; said mounting base having a ring beneath which the ducts terminate, there being walls between the inner ends of said ducts and beneath the ring to form a circular space; said housing having upward inlet extensions of said ducts; the spaces between the ducts at the region of the mounting base forming exhaust openings from the housing there being channels between the inlet extensions of the duct opening within the housing and communicating with said exhaust openings; a stator structure in the housing and extending across the intermediate portions of said channels, said structure including windings having ends projecting at opposite ends of the stator structure; means forming intake openings for the upper ends of said channels; a rotor structure in the housing, and having a shaft and fan structures at opposite ends; a deflector plate mounted on said ring and having an opening located adjacent the fan structure at the lower end of said motor; and a bearing structure carried by said mounting base and located in inwardly spaced relationship to said ring and said deflector plate.

12. In a motor structure: a housing; wall means forming a plurality of angularly spaced ducts extending along the exterior of said housing, there being channels extending between the ducts and opening within the housing; a stator structure and a rotor structure in the housing; means forming intake openings for the ducts at one end of the housing, and exhaust openings for the channels at the other end of the housing; passage forming means serially joining the ducts and the exhaust openings and extending past the said rotor and stator structures at said other end of said housing; passage forming means joining the channels and the intake openings and extending past the rotor and stator structures at said one end of said housing; and a pair of fan elements carried at opposite ends of the rotor structure and respectively interposed in said passage means, said fan elements being arranged respectively to induce air flow in the same directions in said passages whereby the intake openings are located remote from both exhaust openings thus to minimize recirculation of exhausted air.

References Cited by the Examiner

UNITED STATES PATENTS 2,357,923   9/1944   Anderson _____ 310—60

MILTON O. HIRSHFIELD, *Primary Examiner.*

L. L. SMITH, *Assistant Examiner.*